United States Patent [19]
Harada

[11] Patent Number: 6,075,559
[45] Date of Patent: Jun. 13, 2000

[54] VEHICLE MOVING IMAGE PROCESSING METHOD AND SYSTEM

[75] Inventor: Tomoyasu Harada, Susono, Japan

[73] Assignee: Toyota Jidosha Kabushiki Kaisha, Toyota, Japan

[21] Appl. No.: 09/132,715

[22] Filed: Aug. 12, 1998

[30] Foreign Application Priority Data

Nov. 18, 1997 [JP] Japan ..................................... 9-317505

[51] Int. Cl.$^7$ ...................................................... H04N 7/18
[52] U.S. Cl. ............................................................ 348/148
[58] Field of Search .............................. 348/61, 113, 116, 348/118, 143, 148, 149

[56] References Cited

U.S. PATENT DOCUMENTS

| | | | |
|---|---|---|---|
| 5,111,289 | 5/1992 | Lucas | 348/148 |
| 5,521,633 | 5/1996 | Nakajima | 348/148 |
| 5,581,297 | 12/1996 | Koz | 348/152 |
| 5,949,331 | 9/1999 | Schofield | 340/461 |

FOREIGN PATENT DOCUMENTS 3-276987 12/1991 Japan.
9-55937 2/1997 Japan.

*Primary Examiner*—Bryan Tung
*Attorney, Agent, or Firm*—Finnegan, Henderson, Farabow, Garrett & Dunner, L.L.P.

[57] ABSTRACT

A vehicle moving image processing method of compressing image data in a travel direction of a vehicle photographed from the vehicle which moves on a road, the method comprising the steps of: photographing an image in the travel direction of the vehicle and acquiring image data; dividing the image data into image data in a first area with a small change degree and image data in a second area with a large change degree in response to a change degree of the image data with a move of the vehicle; and compressing the image data in the first area by a first compression process and the image data in the second area by a second compression process different from the first compression process.

37 Claims, 3 Drawing Sheets

VEHICLE MOVING IMAGE PROCESSING METHOD AND SYSTEM

BACKGROUND OF INVENTION

This invention relates to a method and a system for compressing image data photographed with a camera, etc., and in particular to a method and a system for compressing image data photographed with a camera, etc., installed on a moving vehicle.

Hitherto, there are some known ways for converting image data photographed with a camera into digital data and compressing the data for the purpose of lessening the data amount as much as possible and using for image data transmission. MPEG (Motion Picture Experts Group) standardized at present is a representative example.

An art for compressing image data and decreasing the transmission information amount is disclosed in Unexamined Japanese Patent Application No. Hei 9-55937. It is an art for compressing still and moving images separately to enhance the compression efficiency of image data with still and moving images mixed; a moving image is compressed at a high compression ratio and a still image is compressed at a low compression ratio.

In recent years, a system of photographing a front landscape, etc., with a camera installed on a vehicle and recording as image data has been developed. Here, it is possible to compress image data photographed with a camera installed on a vehicle using the image data compression process described above. To compress image data by the process when a vehicle moves, image data is compressed evenly by the moving image compression process. In the moving image compression process, it is a standard practice to use a "motion prediction" process to compress image data throughout the entire image.

However, such a motion prediction generally requires a high computation capability. It is often economically difficult to use a CPU or any other hardware having a high computation capability with a vehicle, and an image compression process not requiring a high computation capability is desired.

SUMMARY OF INVENTION

It is therefore an object of the invention to provide a compression method and system for appropriately compressing a moving image photographed from a vehicle without imposing a computation load on a CPU as much as possible or without using high-speed hardware.

To the end, according to a first aspect of the invention, there is provided a vehicle moving image processing method of compressing image data in a travel direction of a vehicle photographed from the vehicle moving on a road, the method comprising photographing an image in the travel direction of the vehicle and getting image data, dividing the image data into image data in a first area with a small change degree and image data in a second area with a large change degree in response to the change degree of the image data with a move of the vehicle, and compressing the image data in the first area by a first compression process and the image data in the second area by a second compression process different from the first compression process.

The compression process fitted to the image data in the first and second areas are separately selected for compressing the image data, whereby the computation load is taken off the CPU and image quality degradation in each area can be suppressed as much as possible for compressing moving image data as compared with the case where the whole image data is compressed by the same moving image compression process.

According to a second aspect of the invention, the dividing step adopts a far part in front of the vehicle in the travel direction thereof as the first area and the portion surrounding the first area as the second area. Thus, an image can be easily divided into a far part in front of the vehicle in the travel direction thereof with a small change degree with a move of the vehicle and its peripheral part with a larger change degree.

Acording to a third aspect of the invention, the method of the first or second aspect of the invention further comprises: getting road width information of the road on which the vehicle moves, wherein the dividing step sets the width of the first area in response to the road width information. Thus, an image can be effectively divided into a road image and an image of other parts and compression fitted to the importance of each part can be executed. For example, if information on vehicles in front of the vehicle or crossing information is important, the data in the first area can be compressed by fine quantization.

According to a fourth aspect of the invention, the method fo the first or second aspect of the invention further comprises: getting moving vehicle speed information, wherein the dividing step sets the size of the first area in response to the moving vehicle speed information. For example, when the vehicle speed is low, the size of the first area is enlarged or when the vehicle speed is high, the size of the first area is reduced, whereby an image can be effectively divided into an image with a large change degree and an image with a small change degree. The image data amount at a given distance covered by the vehicle after compression can also be made even, etc., by setting the area of the first area properly.

According to a fifth aspect of the invention, in any of the first to fourth aspects of the invention, the compressing step compresses the image data in the first area by a compression process fitted to a still image and the image data in the second area by a compression process fitted to a moving image. Thus, good use of the compression process fitted to a still image is made aggressively, whereby the computation load can be decreased.

According to a sixth aspect of the invention, in any of the first to fourth aspects of the invention, the compressing step compressed the image data in the second area by coarser quantization as compared with the image data in the first area. Thus, effective image data compression with a small apparent difference at the image data reproduction time is enabled by adopting coarse quantization fitted to an area with a large image change degree with a move of the vehicle and originally poor in image quality.

According to a seventh aspect of the invention, there is provided a vehicle moving image processing system of compressing image data in a travel direction of a vehicle photographed from the vehicle moving on a road, the system comprising image getting means for photographing an image in the travel direction of the vehicle and getting image data, division means for dividing the image data into image data in a first area with a small change degree and image data in a second area with a large change degree in response to the change degree of the image data with a move of the vehicle, and image compression means for compressing the image data in the first area by a first compression process and the image data in the second area by a second compression process different from the first compression process.

According to the system, the compression processs fitted to the image data in the first and second areas are separately selected for compressing the image data, whereby the computation load is decreased and image quality degradation in each area can be suppressed as much as possible for compressing moving image data as compared with the case where the whole image data is compressed by the same moving image compression process.

DETAILED DESCRIPTION OF PREFERRED EMBODIMENTS

Referring now to the accompanying drawings, there are shown preferred embodiments of the invention.

Figure 1:
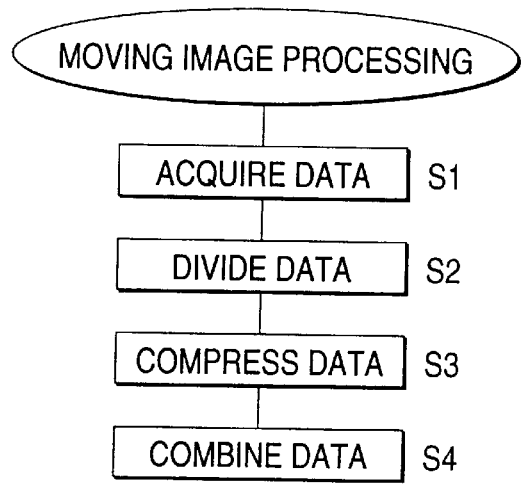
FIG. 1 is a flowchart to show a process flow of a moving image processing method and system according to the invention.
Figure 2:
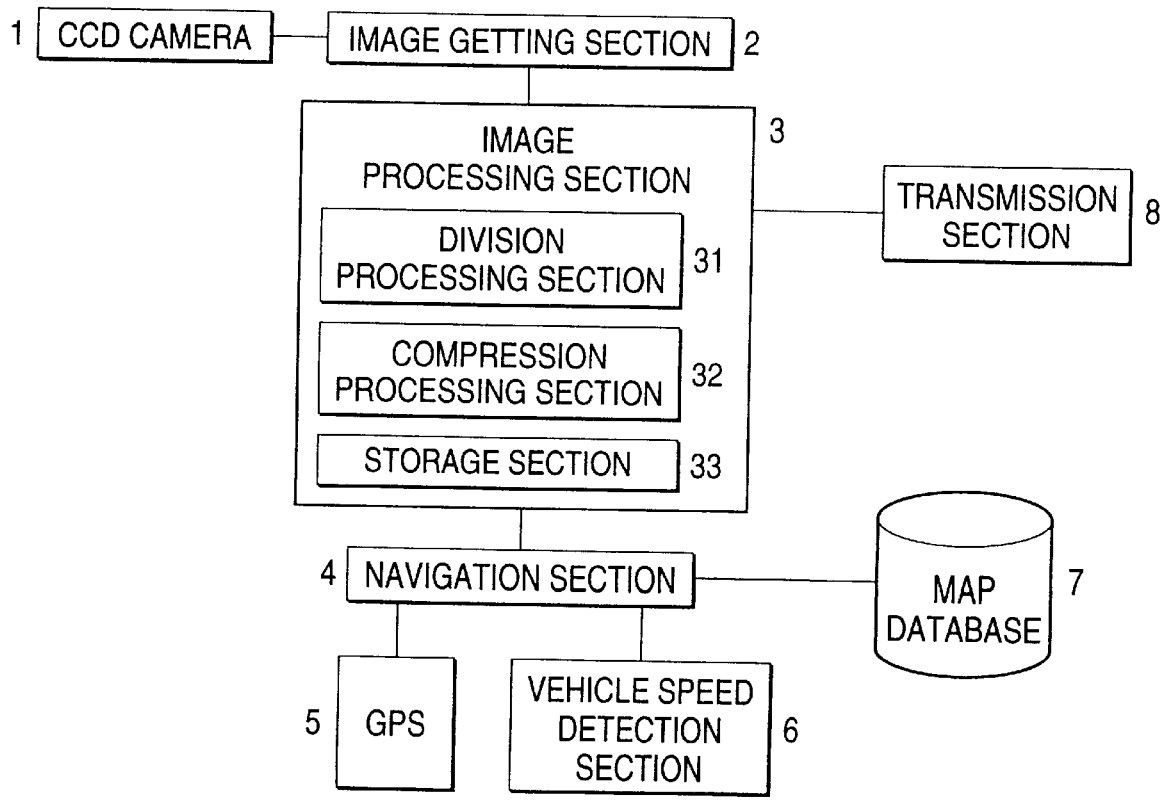
FIG. 2 is a block diagram to show the configuration of a moving image processing system according to the invention.

FIG. 1 is a flowchart to show a flow of a moving image processing method according to a first embodiment of the invention. FIG. 2 is a block diagram of a system for realizing the moving image processing method according to the first embodiment of the invention.

As shown in FIG. 2, a CCD camera 1 is installed on a vehicle. It is fixed on the upper part of window shielded glass inside the vehicle room so as to photograph the road face before the vehicle, buildings on both sides of a road, and the far front sight. An image getting section 2 for getting photographed image data at step S1 in FIG. 1 is connected to the CCD camera 1. An image processing section 3 is connected to the image getting section 2 for transferring image data acquired from the CCD camera 1 to the image processing section 3 as 1-frame image data at predetermined time intervals (of about several 10 msec). The image processing section 3 is provided with a division processing section 31 for dividing the image data transferred from the image getting section 2 into a first area and second area at step S2, a compression processing section 32 for compressing data in the first and second areas at step S3, and a storage section 33 for temporarily storing the image data sent from the image getting section 2 and the compressed image data.

The storage section 33 stores data provided at step S4 by combining the image data in the first and second areas after compression processing at step S3. At step S4, the image data in the first area and the image data in the second area once divided at step S2 and compressed at step S3 are combined into 1-frame image data. The image data combined at step S4 is stored in the storage section 33 in time sequence. Here, the image data combined at step S4 is stored in the storage section 33 in the image processing section 3, but may be stored in an external storage unit (not shown) such as a hard disk connected to the image processing section 3.

The image processing section 3 is also connected to a navigation section 4 for executing navigation processing of route computation, present position display, route guide, etc.

To execute navigation processing, a GPS (Global Positioning System) section 5, a vehicle speed detection section 6, and a map database 7 are connected to the navigation section 4.

The map database 7 stores road shape information, information concerning the road width such as the number of lanes, and information used for image compression processing described later.

A transmission section 8 for transmitting the image data compressed in the image processing section 3 to the outside of the vehicle in time sequence is connected to the image processing section 3. It may be made of not only a device using a radio wave like a car phone or a portable phone, but also a light beacon transmitter, etc.

Subsequently, the moving image compression processing operation in the embodiment will be discussed.

Figure 3:
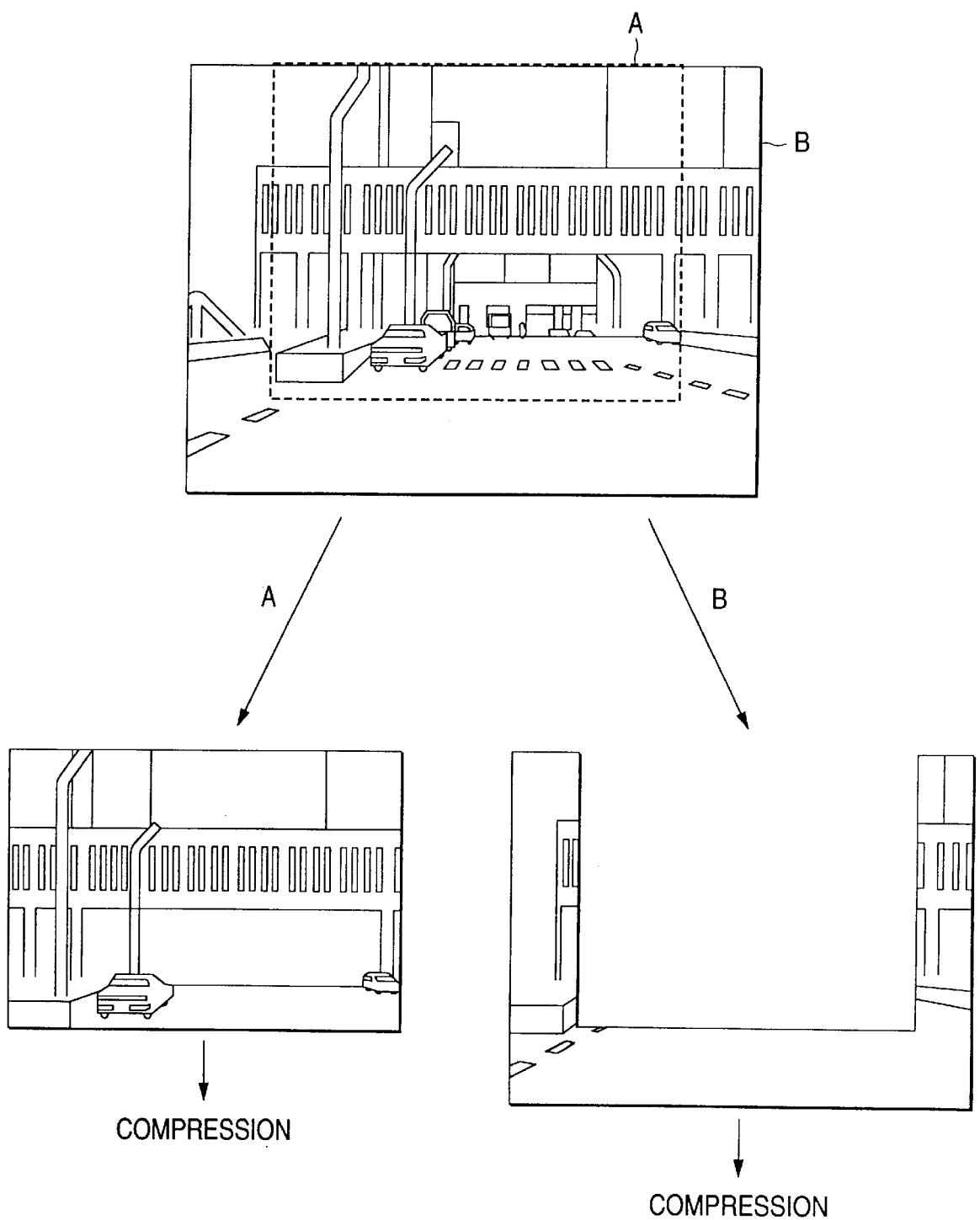
FIG. 3 is an illustration to describe image data division processing in the invention.

FIG. 3 is a schematic representation to describe division processing in the division processing section 31. The moving image compression processing operation will be discussed with reference to FIG. 3.

First, when a photograph of the sight in front of the vehicle is taken with the CCD camera 1, an image as shown on the left of FIG. 3 is obtained in the image getting section 2 at step S1 in FIG. 1 and is transferred to the image processing section 3. It corresponds to a 1-frame image extracted at one time from the images transferred from the image getting section 2 to the image processing section 3 at predetermined time intervals. As shown in FIG. 3, the division processing section 31 in the image processing section 3 divides the image into a first area A of the far part in front of the vehicle and a second area B of the part surrounding the first area A at step S2. It may divide the image at the fixed position shown in FIG. 3 or at a different position in response to conditions concerning the road width and the moving vehicle speed. Image division position change responsive to the conditions will be discussed with reference to FIG. 4.

Figure 4:
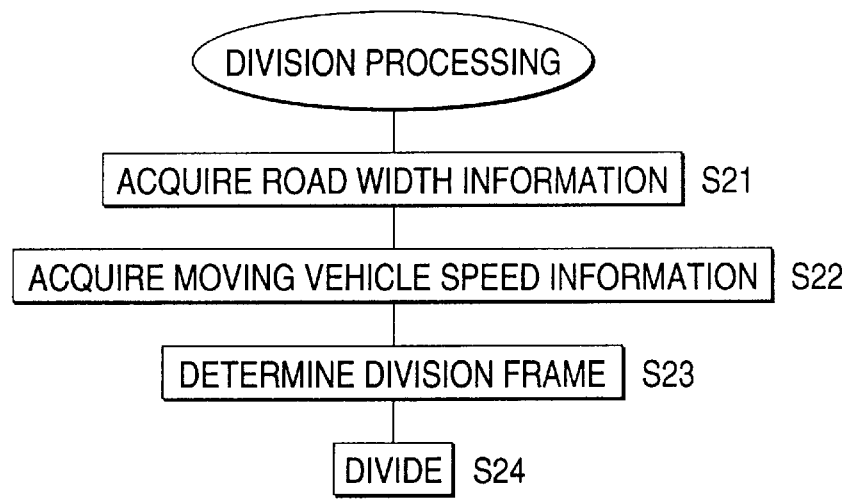
FIG. 4 is a flowchart to describe a flow of image data division processing in the invention.

FIG. 4 is a flowchart to describe a flow of division processing executed in the division processing section 31 at step S2 in detail. When division processing is started, first, road width information is obtained at step S21 in FIG. 4 by reading road width information of the road on which the current position of the vehicle is placed, calculated by the navigation section 4 from the map database 7 and transferring the read road width information to the image processing section 3. Next, moving vehicle speed information is obtained at step S22. To do this, the moving vehicle speed detected in the vehicle speed detection section 6 is transferred through the navigation section 4 to the image processing section 3. Subsequently, a division frame is determined based on the road width information and the moving vehicle speed information at step S23.

To determine the division frame, first the road width information is considered and the width of the first area A is determined in response to the road width to obtain the first area A limited to the inside of the road width. After the road width information is considered and the width of the first area A is determined, the moving vehicle speed information is considered. Based on the moving vehicle speed information, the division frame is changed so as to reduce the first area A as the moving vehicle speed becomes fast. Since a portion which is intense in motion and appears to flow grows in the surroundings of the photographed image with an increase in the vehicle speed, the division frame is changed so that compression fitted to the moving image can be applied to the portion. To reduce the first area A based on the moving vehicle speed, the first area A may be reduced only in the vertical width or may be reduced analogously as a whole.

After the division frame is determined, the image data is divided into the first area A and the second area B according to the division frame at step S24 and the division processing at step S2 is complete.

The image data in the first area A and the image data in the second area B resulting from the division processing at step S2 are compressed in the compression processing section 32. Since the image data in the first area A is image data of the far portion in front of the vehicle, the image change degree with a forward move of the vehicle (change degree with time) is small. In contrast, the image data in the second area B is at a position comparatively close to the CCD camera, thus the image change degree as the vehicle moves is large. That is, the image data in the second area B changes largely as flowing beyond the shooting range.

The image data in the first area A with a small change degree is image data close to a still image as compared with the image data in the second area B. Therefore, in the embodiment, the image data in the first area A is compressed by a compression process fitted to a still image and the image data in the second area B is compressed by a compression process fitted to a moving image at step S3. "Wavelet conversion method," "fractal method," or the like is used appropriately as the compression process fitted to a still image and "MPEG2," etc., in appropriately used as the compression process fitted to a moving image.

The compression processing performed here is processing of quantizing image data in proper units and then applying various types of conversion for deleting data corresponding to non-featuring parts. The "wavelet conversion method," "fractal method," and "MPEG2" mentioned above also correspond to the compression processing.

The image data in the first area A and the image data in the second area B compressed in the compression processing section 32 as described above are combined into 1-frame image data at step S4 and the resultant data is stored in the storage section 33. The image data transferred to the image processing section 3 at predetermined time intervals is thus stored in the storage section 33 in time sequence. The stored image data can be transmitted to the outside of the vehicle from the transmission section 8 or recorded on a recording medium such as a hard disk or DVD-RAM (not shown) in a compressed state by later processing.

The image data photographed with the CCD camera 1 is thus compressed appropriately by properly using the compression process suitable for a still image or the compression process fitted to a moving image for each area, so that the data amount is decreased and the calculation load is reduced as compared with the case where the "motion prediction" process is sued to compress image data throughout a whole image. Resultantly, in the later processing, the time required for transmission is shortened and the storage area occupation ratio of the storage medium is decreased.

Subsequently, a second embodiment of the invention will be discussed.

In the first embodiment, the image data in the first area A is compressed by the compression process suitable for a still image and the image data in the second area B is compressed by the compression process appropriate for a moving image. In the second embodiment, a first area A is finely quantized (for example, with a quantization step as a standard value) and a second area B is coarsely quantized (for example, with a quantization step as twice the standard value), whereby highly accurate image information is provided in the first area A containing the sight on a far road in front of the vehicle, thus to drive the vehicle, more important information can be acquired reliably as image data and the image data amount can be decreased because of coarse quantization in the second area B. Since the second area B originally is intense in motion and is poor in image quality, the apparent difference at the image data reproduction time is not so conspicuous although coarse quantization is executed.

The embodiments have been described, but the invention is not limited to them. For example, whether or not the vehicle moves on a straight road based on information from the navigation section 4 and only when the vehicle moves on a straight road, image data may be obtained to narrow down necessary image data.

The embodiment applies to images before the vehicle in the travel direction thereof, but is also applicable to a case where a CCD camera is installed toward the rear of a vehicle and image data in the rear of the vehicle is obtained and compressed, needless to say.

In the second embodiment, the second area B is coarsely quantized, but buildings, etc., on the sides of a road are positioned as importance information, so that the first area A may be coarsely quantized and that the second area B may be finely quantized to provide highly accurate image data therein.

Last, a modified embodiment relevant to the invention will be discussed. It is also an example concerning compression of moving images and is intended for improvement in the compression efficiency of image data.

Figure 5A:
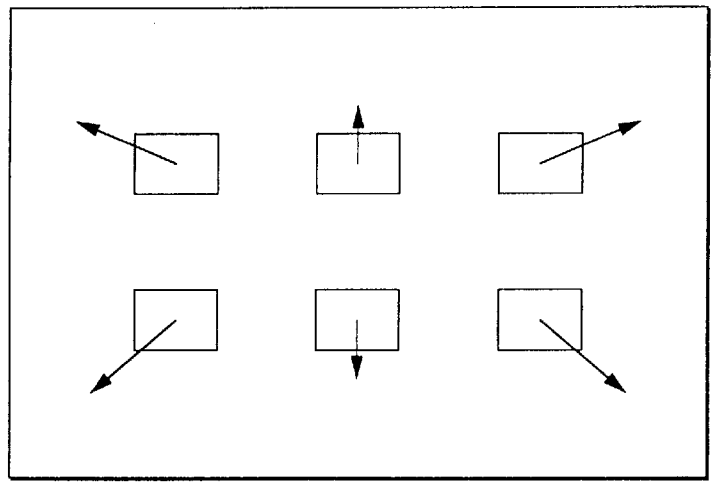
FIGS. 5A and 5B are drawings to describe predicted image data preparation processing in a modified embodiment.
Figure 5B:
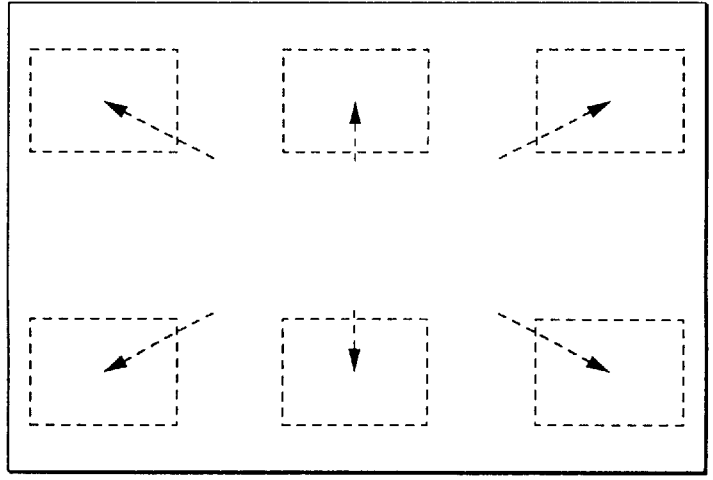

FIGS. 5A and 5B are drawings to describe the modified embodiment. FIG. 5A is an illustration to describe an image at current time T0 and 5B is an illustration to describe a predicted image in t seconds after the current time T. In the modified embodiment like other embodiments of the present invention, a photograph of the sight in front of a vehicle is taken with a CCD camera installed on the vehicle. The steps to transfer of the photographed image data to an image processing section are similar to those in the previous embodiments of the invention. In the modified embodiment, image data in t seconds is predicted from the transferred image data, as described below:

The image data transferred to the image processing section is processed in a predicted image computation section and predicted image data in t seconds shown in FIG. 5B is prepared from image data at the time T0 shown in FIG. 5A. To predict and prepare the image data in t seconds from the image at the time T0 shown in FIG. 5A, a motion vector (arrow) for each predetermined area (area surrounded by the solid frame) of image data is computed in response to the moving vehicle speed and the resize amount (enlargement amount) is also computed, whereby predicted image data with predetermined areas (areas surrounded by dotted frames) dispersed to the surrounds and enlarged is prepared as shown in FIG. 5B. The data amount can be reduced by storing only the difference data between the predicted image data in t seconds and image data in t seconds actually photographed and obtained in a storage section as the data in t seconds.

The modified embodiment is also processing relevant to compression of moving images. Therefore, the compression processing in the modified embodiment can also be applied to the first area A or the second area B in the previous embodiments of the invention.

As described above, according to the invention, the image data in the travel direction of the vehicle is divided in response to the image data change degree with a move of the vehicle, thus compression fitted to the image data in the first area and compression fitted to the image data in the second area can be executed separately and moving image data can be compressed without requiring a computation capability as much as possible.

The width or size of the first area is changed in response to the conditions of the road width, the moving vehicle speed, etc., whereby the image data amount can be changed flexibly in response to the use purpose.

What is claimed is:

1. A vehicle moving image processing method of compressing image data in a travel direction of a vehicle photographed from the vehicle which moves on a road, the method comprising:

photographing an image in the travel direction of the vehicle and acquiring image data;

dividing the image data into image data in a first area with a small change degree and image data in a second area with a large change degree in response to a change degree of the image data with a move of the vehicle; and compressing the image data in the first area by a first compression process and the image data in the second area by a second compression process different from the first compression process.

2. The vehicle moving image processing method as claimed in claim 1, wherein the compressing step compressed the image data in the first area by a compression process fitted to a still image and the image data in the second area by a compression process fitted to a moving image.

3. The vehicle moving image processing method as claimed in claim 2, wherein the compression process for the first area includes a wavelet conversion method.

4. The vehicle moving image processing method as claimed in claim 2, wherein the compression process for the first area includes a fractal mothod.

5. The vehicle moving image processing method as claimed in claim 2, wherein the compression process for the second area includes a MPEG2 method.

6. The vehicle moving image processing method as claimed in claim 1, wherein the compressing step compressed the image data in the second area by coarser quantization as compared with the image data in the first area.

7. The vehicle moving image processing method as claimed in claim 1, further comprising:

acquiring road width information of a road on which the vehicle moves, wherein the dividing steps sets a width of the first area in response to the road width information.

8. The vehicle moving image processing method as claimed in claim 7, wherein the compressing step compresses the image data in the first area by a compression process fitted to a still image and the image data in the second area by a compression process fitted to a moving image.

9. The vehicle moving image process method as claimed in claim 8, wherein the compression process for the first area include a wavelet conversion method.

10. The vehicle moving image processing method as claimed in claim 8, wherein the compression process for the first area includes a fractal mothod.

11. The vehicle moving image processing method as claimed in claim 8, wherein the compression process for the second area includes a MPEG2 method.

12. The vehicle moving image processing method as claimed in claim 7, wherein the compressing step compressed the image data in the second area by coarser quantization as compared with the image data in the first area.

13. The vehicle moving image processing method as claimed in claim 1, further comprising:

acquiring moving vehicle speed information, wherein the dividing step sets a size of the first area in response to the moving vehicle speed information.

14. The vehicle moving image processing method as claimed in claim 13, wherein the compressing step compressed the image data in the first area by a compression process fitted to a still image and the image data in the second area by a compression process fitted to a moving image.

15. The vehicle moving image processing method as claimed in claim 14, wherein the compression process for the first area includes a wavelet conversion method.

16. The vehicle moving image processing method as claimed in claim 14, wherein the compression process for the first area includes a fractal mothod.

17. The vehicle moving image processing method as claimed in claim 14, wherein the compression process for the second area includes a MPEG2 method.

18. The vehicle moving image processing method as claimed in claim 13, wherein the compressing step compresses the image data in the second area by coarser quantization as compared with the image data in the first area.

19. The vehicle moving image processing method as claimed in claim 1 wherein the dividing step adopts a far part in front of the vehicle in the travel direction.

20. The vehicle moving image processing method as claimed in claim 19, wherein the compressing step compresses the image data in the first area by a compression process fitted to a still image and the image data in the second area by a compression process fitted to a moving image.

21. The vehicle moving image processing method as claimed in claim 20, wherein the compression process for the first area includes a wavelet conversion method.

22. The method moving image processing method as claimed in claim 20, wherein the compression process for the first area includes a fractal mothod.

23. The vehicle moving image processing method as claimed in claim 20, wherein the compression process for the second area includes a MPEG2 method.

24. The vehicle moving image processing method as claimed in claim 19, wherein the compressing step compresses the image data in the second area by coarser quantization as compared with the image data in the first area.

25. The vehicle moving image processing method as claimed in claim 19, further comprising:

acquiring road width information of a road on which the vehicle moves, wherein the dividing step sets a width of the first area in response to the road width information.

26. The vehicle moving image processing method as claimed in claim 25, wherein the compressing step compresses the image data in the first area by a compression process fitted to a still image and the image data in the second area by a compression process fitted to a moving image.

27. The vehicle moving image processing method as claimed in claim 26, wherein the compression process for the first area includes a wavelet conversion method.

28. The vehicle moving image processing method as claimed in claim 26, wherein the compression process for the first area includes a fractal mothod.

29. The vehicle moving image processing method as claimed in claim 26, wherein the compression process for the second area includes a MPEG2 method.

30. The vehicle moving image processing method as claimed in claim 25, wherein the compressing step compresses the image data in the second area by coarser quantization as compared with the image data in the first area.

31. The vehicle moving image processing method as claimed in claim 19, further comprising:

acquiring moving vehicle speed information, wherein the dividing step sets a size of the first area in response to the moving vehicle speed information.

32. The vehicle moving image processing method as claimed in claim 31, wherein the compressing step compresses the image data in the first area by a compression process fitted to a still image and the image data in the second area by a compression process fitted to a moving image.

33. The vehicle moving image processing method as claimed in claim 32, wherein the compression process for the first area includes a wavelet conversion method.

34. The vehicle moving image processing method as claimed in claim 32, wherein the compression process for the first area includes a fractal mothod.

35. The vehicle moving image processing method as claimed in claim 32, wherein the compression process for the second area includes a MPEG2 method.

36. The vehicle moving image processing method as claimed in claim 31, wherein the compressing step compresses the image data in the second area by coarser quantization as compared with the image data in the first area.

37. A vehicle moving image processing system of compressing image data in a travel direction of a vehicle photographed from the vehicle moving on a road, the method comprising:

image getting means for photographing an image in the travel direction of the vehicle and acquiring image data;

division means for dividing the image data into image data in a first area with a small change degree and image data in a second area with a large degree in response to a change degree of the image data with a move of the vehicle; and image compression means for compressing the image data in the first area by a first compression process and the image data in the second area by a second compression process different from the first compression process.

\* \* \* \* \*

UNITED STATES PATENT AND TRADEMARK OFFICE
CERTIFICATE OF CORRECTION

PATENT NO.    : 6,075,559
DATED         : June 13, 2000
INVENTOR(S)   : Tomoyasu Harada It is certified that error appears in the above-identified patent and that said Letters Patent is hereby corrected as shown below:

Column 7,
Claim 2,
Lines 28-29, "compressed" should read -- compresses --.

Claim 4,
Line 38, "mothod" should read -- method --.

Claim 6,
Lined 43-44, "compressed" should read -- compresses --.

Claim 7,
Line 50, "steps" should read -- step --.

Claim 9,
Line 59, "process" should read -- processing --.
Line 61, "include" should read -- includes --.

Claim 10,
Line 64, "mothod" should read -- method --.

Column 8,
Claim 12,
Lines 2-3, "compressed" should read -- compresses --.

Claim 14,
Lines 12-13, "compressed" should read -- compresses --.

Claim 16,
Line 21, "mothod" should read -- method --.

Claim 19,
Line 30, after "direction", insert -- thereof as the first area and a portion surrounding the first area as the second area --.

UNITED STATES PATENT AND TRADEMARK OFFICE
CERTIFICATE OF CORRECTION

PATENT NO.   : 6,075,559
DATED        : June 13, 2000
INVENTOR(S)  : Tomoyasu Harada It is certified that error appears in the above-identified patent and that said Letters Patent is hereby corrected as shown below:

Column 8 contd.
Claim 22,
Line 40, "method moving" should read -- vehicle moving --.
Line 42, "mothod" should read -- method --.

Claim 28,
Line 67, "mothod" should read -- method --.

Column 9,
Claim 34,
Line 24, "mothod" should read -- method --.

Column 10,
Claim 37,
Line 16, "large degree" should read -- large change degree --.

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*